April 14, 1970     W. P. ANDERSON     3,506,222
AIRCRAFT SUPPORTING DEVICE
Filed Nov. 24, 1967     2 Sheets-Sheet 1
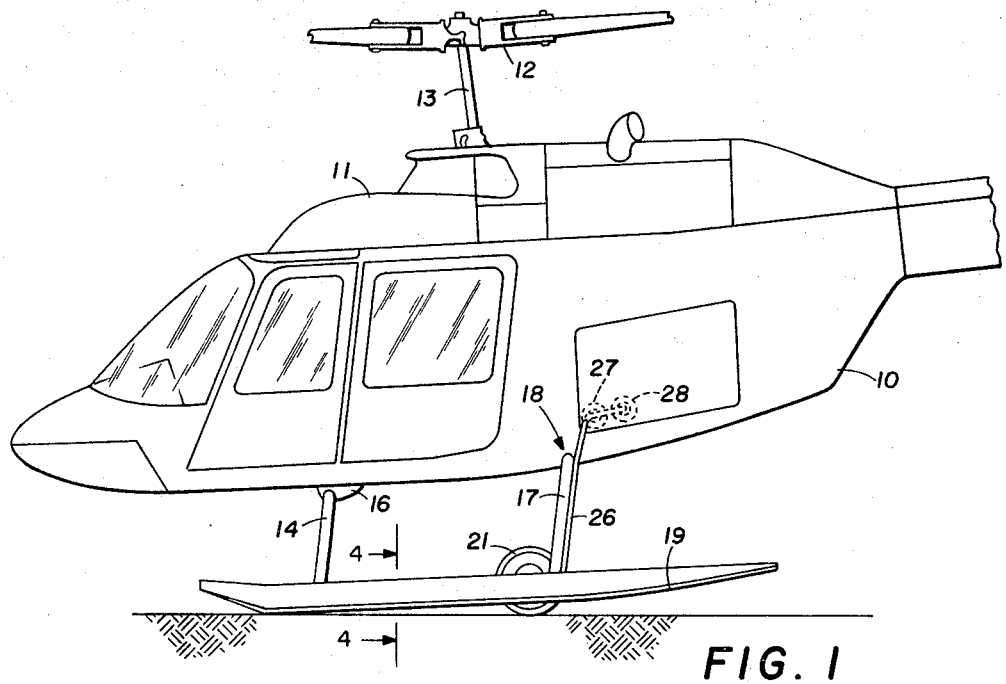
FIG. 1
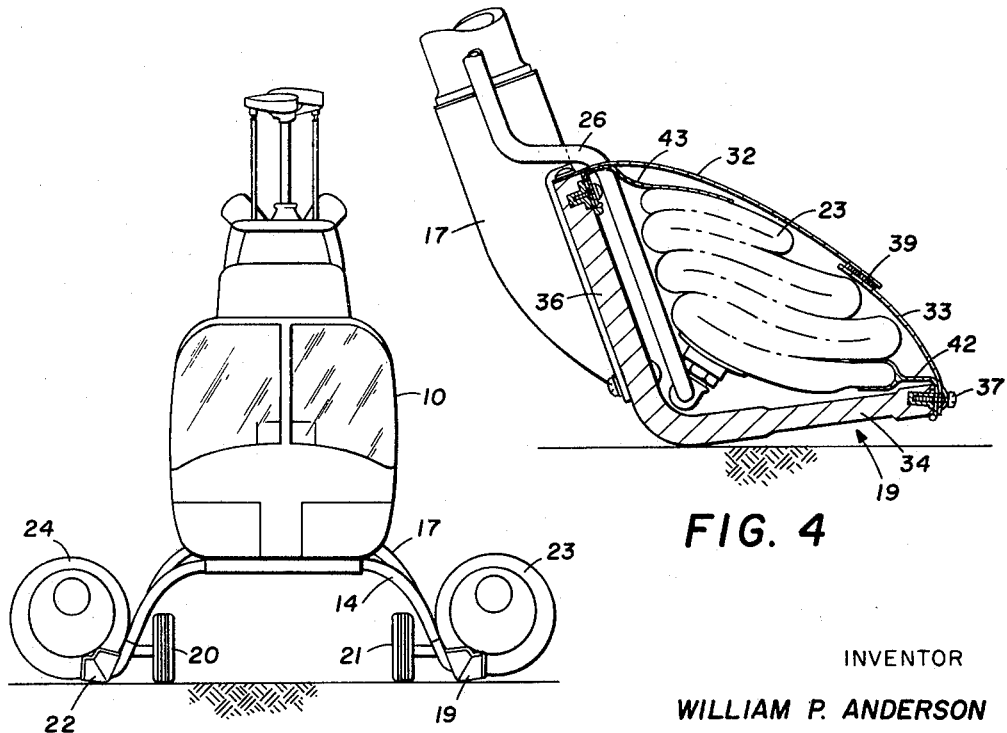
FIG. 4
FIG. 2
INVENTOR
WILLIAM P. ANDERSON
ATTORNEY

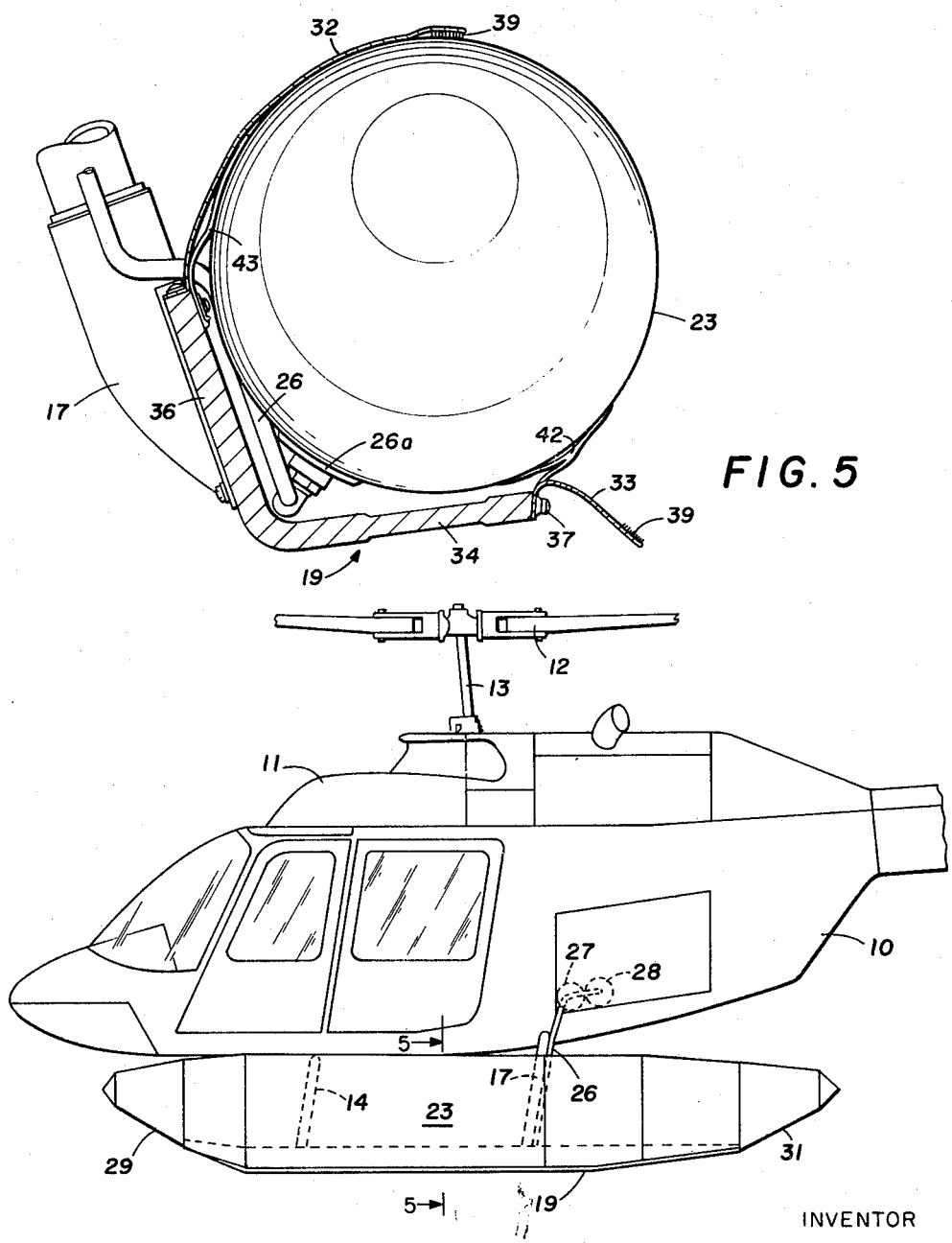

United States Patent Office 3,506,222
Patented Apr. 14, 1970

3,506,222
AIRCRAFT SUPPORTING DEVICE
William P. Anderson, Arlington, Tex., assignor to Bell Aerospace Corporation, Hurst, Tex., a corporation of Delaware
Filed Nov. 24, 1967, Ser. No. 685,580
Int. Cl. B64c 25/32, 25/56
U.S. Cl. 244—101                                       6 Claims

ABSTRACT OF THE DISCLOSURE

An aircraft landing gear system including a pair of trough-like runners located on each side of the aircraft and attached to strut structures depending therefrom. The trough-like runners consist of two rigid metal plates one of which supports the aircraft with the plane thereof at an acute angle relative to the earth and the second of which is oriented to an obtuse angle relative to the first. An elongated inflatable flotation bag is folded into the interior angle portion of each runner and secured thereto by flexible straps attached to the inner surface of each plate and to the inflatable bag. A two-piece releasable cover is attached to the metal plates and forms an enclosure with the trough-like runner. The flotation bags are deployed in flight through a pressurized gas inflation system contained within the aircraft.

BACKGROUND OF THE INVENTION

This invention relates to an aircraft landing device and more particularly to a helicopter landing gear suitable for operation on various types of terrain and water.

A landing gear in accordance with the present invention is capable of supporting an aircraft on various types of terrain including snow, sand and mud. It is also capable of supporting the aircraft on water.

Under normal conditions, an aircraft can be expected to land on a hard surface runway or prepared landing area and a landing gear system is provided for operations under these conditions. This landing system usually adds a weight penalty to the aircraft that cannot economically be eliminated at the present time. Also, the landing gear system for normal landings may produce some aerodynamic drag which is somewhat detrimental in high speed flight. Since all aircraft must be provided with some landing system, the weight penalty and aerodynamic drag associated therewith must be accepted and minimized to the extent possible. However, where aircraft, particularly helicopters, operate over water or terrain where landing sites cannot be prepared, it is desirable that an auxiliary landing gear be provided for buoyantly supporting the aircraft in the event a landing must be made under marine conditions on other than a prepared site.

In accordance with the present invention, there is provided a landing gear system for supporting an aircraft under normal landing conditions and also under marine conditions. An emergency landing system is included as a part of the normal landing gear, thus minimizing any added weight penalty. In addition, the emergency system folds within the normal landing gear in a manner that substantially eliminates any increase of aerodynamic drag over that developed by the normal landing system.

Thus, a feature of the present invention is to provide a landing gear system for supporting an aircraft on various types of terrain and water.

Another feature of the present invention is to provide a landing gear system for use on various types of terrain and water wherein any additional weight penalty is minimized.

Still another feature of the present invention is to provide a landing gear system for supporting an aircraft on various types of terrain and water having a low aerodynamic drag at high speed flight.

SUMMARY

This invention includes the novel features set forth in the appended claims for an aircraft landing gear which comprises a first supporting device including a pair of elongated trough-like runners attached to the aircraft for normal landing support, and an auxiliary supporting device including an inflatable tube foldable into each of said trough-like runners and secured thereto and storable therein when in a deflated condition for supporting said aircraft under marine conditions.

A more complete understanding of the invention and its advantages will be apparent from the specification and claims and from the accompanying drawings illustrative of the invention.

BRIEF DESCRIPTION OF THE DRAWINGS

FIGURE 1 is a side elevational view of a helicopter, partially cutaway, showing the landing gear of this invention for normal landing conditions;

FIGURE 2 is a front elevational view of the helicopter of FIGURE 1 showing the auxiliary landing device in its operative position;

FIGURE 3 is a side elevational view of a helicopter, partially cutaway, showing the landing gear of this invention in its operative position for marine landing conditions;

FIGURE 4 is a sectional view of the landing gear taken along the line 4—4 of FIGURE 1; and FIGURE 5 is a sectional view of the landing gear as taken along the line 5—5 of FIGURE 3.

A PREFERRED EMBODIMENT

Referring to FIGURE 1, the helicopter shown comprises an elongated fuselage or hull 10 having a pylon 11 housing an engine and the associated gearing required to rotate a lifting rotor 12 about a vertical axis 13. The tail portion is cutaway for simplicity; it includes an anti-torque rotor in accordance with standard single rotor helicopter design.

The landing gear system consists of a front supporting strut 14 fastened to the fuselage 10 at a bracket 16 and a rear strut 17 fastened to the fuselage at a point 18. A trough-like runner 19 is bolted to the lower ends of the struts 14 and 17 and provides support of the helicopter on firm terrain such as a prepared landing site. The runner 19 is equipped with a wheel 21 for ground handling of the helicopter.

As shown in FIGURE 2, two runners are required to support a helicopter, the runner 19 is attached to the right extensions of the struts 14 and 17 and a runner 22 is bolted to the left extensions and is also equipped with a wheel 20. The helicopter is shown in a front view of the fuselage 10. A pair of flotation bags 23 and 24 are attached to the runners 19 and 22, respectively, for supporting the helicopter when landing in a marine environment or on soft terrain such as mud or snow. The bags 23 and 24 can be deployed in flight by means of a pipe 26 extending to the interior of the bags from a source of pressurizing gas, such as $CO_2$ cylinders 27 and 28.

Suitable inlet-outlet control mechanism is provided in connection with the pipe 26 so as to obtain the desired inflation or deflation of the flotation bags 23 and 24 from the pressurizing gas cyclinders 27 and 28. In addition to the cylinders 27 and 28, the pipe 26 may be connected to a gas generating unit including a valve control arrangement to provide for introduction of a gas charge into the bags 23 and 24 to expand them from a retracted position to an extended position. For escape of gas from the bags as they are collapsed toward the stowage position, a suitable vacuum generating unit may be provided.

Or, an air compressor may be connected to the pipe 26 and so arranged as to operate to inflate the bags 23 and 24 as they move toward an extended position, while a valve device permit escape of the air from the bags in conjunction with retraction movements thereof.

In FIGURE 3 the flotation bag 23 is shown as an elongated inflated tube consisting of a plurality of individual sections such as a front section 29 and a rear section 31 both of which taper in at the bottom and two sides from the central chamber to an end closure wall that may be hemispherically shaped. Thus, the inflatable bag 23 is longitudinally compartmented and defined by a series of discrete tubular inflatable sections, such as the end sections 29 and 31, operatively secured together to define a single buoyant supporting means. The inflatable tubes, which may be constructed of suitably shaped pieces of impervious flexible material such as tough, yet lightweight rubber or rubber compound of the type well known for use in manufacturing inflatable life rafts and light pneumatic articles, are secured to one another in a manner well known in the art. The exact material of which the bag 23 is constructed must have rugged characteristics, including abrasion and puncture resistance, to resist the forces applied to the bag structure when the aircraft is landed in a marine environment, and to resist puncture from rocks or other foreign objects when the aircraft is landed on terrain such as mud or snow where the weight of the aircraft cannot be supported fully on the runners 19 and 22. The bags 23 and 24 are attached to their respective runners by means to be described hereinafter in detail.

Referring to FIGURE 4, there is shown a sectional view of the runner 19 including the inflatable bag 23 in a deflated condition and stored in an enclosure formed by flexible door members 32 and 33. The runner 19 consists of a first metal plate 34 at an acute angle relative to the earth's surface and a second plate 36 at an obtuse angle relative to the first shown bolted to the strut 17. Door member 33 is attached to the plate 34 by a bolt 37. Similarly, the door member 32 is attached to the plate 36 and forms an interlocking closure with the door member 33 by means of an interlocking fibrous strip 39. The pressurizing gas is supplied to the inflatable bag 23 through the line 26 which includes a coupling 26a attached to an exterior portion of the bag. A pair of flexible straps 42 and 43, attached to the inflatable bag 23 and to the rigid plates 34 and 36, respectively, secures the bag to the runner 19. The bag is deflated into the condition shown by hand folding or by applying, for example, a vacuum to the pipe 26 by any means well known in the art.

In operation, when it is desired to provide a landing gear for marine environments or for terrain such as mud and snow, gas pressure is transmitted through the line 26 into the bags 23 and 24. This causes the bags to inflate and the door members move outwardly and each bag achieves a substantially circular cross section at which point maximum flotation is provided. The inflated condition of the bag 23 is shown in FIGURE 5 with the flexible straps 42 and 43 securing the inflated bag to the runner 19. Door members 32 and 33 have been pushed outward after the interlocking fibrous strip has parted.

When buoyant support is no longer required, the bags 23 and 24 are stowed by folding by hand or by applying a partial vacuum to the pipe 26 to evacuate the air or other gas therefrom. To insure that the bag 23, for example, collapses into the enclosure formed by the runner 19 and the door members 32 and 33, an elastic means (not shown) may be provided within the bag 23 and attached to the end enclosures 29 and 31. When the bag is fully inflated, the front end section 29 and the rear end section 31 will be extended as shown in FIGURE 3 and the elastic means will be extended and stressed. As the air is exhausted from the bag, the elastic means will progressively pull and retract the front end section 29 and the rear end section 31 into the enclosure formed by the runner 19 and the door members 32 and 33. It will, of course, be apparent that other door constructions can be used with the inflated bag of this invention, for example, spring loaded rigid plate doors, but within the speed range of present day helicopters the flexible type construction herein described is satisfactory.

Thus, the inflatable bags 23 and 24 provide a buoyant supporting means that can be stored in a space of relatively small volume when deflated, but expands and extends, when inflated, to afford a large and adequate buoyant volume. The structure of the present invention provides a practicable float expansion-retraction mounting and storage arrangement for helicopter aircraft and the like, whereby an amphibious landing gear is provided of relatively simple and inexpensive elements with undesirable aerodynamic drag and additional weight minimized.

In addition to the materials previously mentioned, the flotation bags 23 and 24 may be formed of a flexible fabric such as nylon cloth or the like treated as by vulcanizing neoprene or rubber or other suitable material to render it water-tight and air-tight under the pressures encountered during landing operations. The flexible straps 42 and 43 may be formed of a similar fabric and vulcanized or otherwise fixed to the inflatable bags as preferred. Certain modifications may be made to the flotation bags 23 and 24 which have not been described previously, for example, the interior may be provided with a plurality of partitions (not shown) to form separate independent fluid chambers each supplied with air from a single source or separate sources.

While only one embodiment of a buoyant inflatable bag has been illustrated in the accompanying drawings, and one simple arrangement for securing the bags to the opposite landing gear structures of the helicopter has been disclosed, it should be understood that other buoyant supporting means and other attaching arrangements are possible. Thus, it will be appreciated that a landing gear in accordance with the present invention provides ground handling characteristics similar to those of conventional ground landing gear arrangements. At the same time, the bags 23 and 24 are adapted to function efficiently as floats for supporting the aircraft in connection with water landing operations. The wheel and skid units of the gear provide no appreciable interference with optimum functioning of the bags in connection with water landings and taxiing. On the other hand, when the bags 23 and 24 are fully retracted and stored in the enclosures formed by the runners 19 and 22, they do not appreciably interfere with a normal ground or hard surface landing. In addition to the above, it will be evident that various further modifications are possible in the arrangement and construction of the landing gear components without departing from the scope of the invention.

What is claimed is:

1. A helicopter landing gear convertible for landing in marine environments comprising:
   a runner including a first rigid plate at an acute angle to a hard surface landing area for supporting said aircraft and a second rigid plate joining the first plate along one edge and oriented at an obtuse angle relative thereto to form a trough-like structure,
   an elongated inflatable tube folded into the interior angle portion of said runner,
   flexible straps attached to the inner surface of said plates and to said elongated inflatable tube to secure said tube to said runner,
   releaseable cover means attached to said plates for forming an enclosure therewith when said inflatable tube is in a deflated condition thereby minimizing the aerodynamic drag of said landing gear, and
   means for supplying fluid to said tube to cause inflation thereof to support said aircraft in a marine environment.

2. A helicopter landing gear convertible for landing in marine environments as set forth in claim 1 wherein said releasable cover means includes a first door member attached to one of said plates and a second door member overlapping said first door member, and a fiberous strip secured to the overlapping sections of said door member to form an interlocking closure for said inflatable bag.

3. A helicopter landing gear convertible for landing in marine environments as set forth in claim 1 wherein said elongated inflatable tube is longitudinally compartmented and includes a central chamber, a front section, and a rear section both of which taper in at the bottom and two sides from the central chamber to an end closure wall.

4. A helicopter landing gear for ground and marine environments comprising:

a pair of trough-like runners located on each side of the fuselage of said aircraft and attached to structures depending therefrom, each of said runners including a first rigid plate at an acute angle to a hard surface landing area for supporting said helicopter and a second rigid plate joining the first plate along one edge and oriented at an obtuse angle relative thereto, releasable cover means for each of said runners forming an enclosure therewith, an elongated inflatable tube folded into each enclosure formed by said cover means and said trough-like runner and secured thereto and inflated for marine landings, and means for supplying pressurizing fluid to, and exhausting fluid from, said inflatable tube.

5. A helicopter landing gear as set forth in claim 4 wherein said fluid supply means includes a controllable source of pressurizing gas for initiating inflation of said tube to release said cover means and extend said inflated tube for support of said aircraft.

6. An aircraft landing gear as set forth in claim 5 wherein said elongated inflatable tubes are secured to said runners by means of flexible straps.

References Cited

UNITED STATES PATENTS

| | | | |
|---|---|---|---|
| 2,494,445 | 1/1950 | Moeller | 244—105 |
| 2,544,794 | 3/1951 | Kelley et al. | 244—101 |
| 2,643,835 | 6/1953 | Janney | 244—107 |
| 2,955,785 | 10/1960 | Smith | 244—101 |
| 3,020,009 | 2/1962 | Guilbert | 244—102 |
| 3,154,270 | 10/1964 | Jensen | 244—101 |
| 3,240,449 | 3/1966 | Robinson | 244—105 |

MILTON BUCHLER, Primary Examiner

P. E. SAUBERER, Assistant Examiner

U.S. Cl. X.R.

244—17.17, 105